Aug. 25, 1959 G. J. NORDSTROM ET AL 2,901,604

DISCRIMINATOR CIRCUIT

Filed March 12, 1954 2 Sheets-Sheet 1

INVENTORS
GORDON J. NORDSTROM
JOHN W. SMITH
BY
Moody and Ethington
ATTORNEYS

Aug. 25, 1959 G. J. NORDSTROM ET AL 2,901,604

DISCRIMINATOR CIRCUIT

Filed March 12, 1954 2 Sheets-Sheet 2

INVENTORS
GORDON J. NORDSTROM
JOHN W. SMITH
BY
Moody and Ethington
ATTORNEYS 2,901,604

DISCRIMINATOR CIRCUIT

Gordon J. Nordstrom and John W. Smith, Cedar Rapids, Iowa, assignors to Collins Radio Company, Cedar Rapids, Iowa, a corporation of Iowa Application March 12, 1954, Serial No. 415,863

1 Claim. (Cl. 250—27)

This invention relates to frequency discriminator circuits for producing an output voltage varying in amplitude in accordance with frequency variations of an input voltage. More particularly, the invention relates to that type of discriminator which utilizes balanced reference voltages of known phase and magnitude and a frequency error voltage of variable phase. The phase of a frequency error voltage is caused to vary in accordance with the departure of the input voltage frequency from a predetermined center or mean frequency. Means are provided for detecting the phase of the frequency error voltage with respect to the reference voltages in order to provide a measure of the frequency departure of the input voltage from the center frequency. This type of discriminator has numerous applications, including automatic frequency control.

The present invention is especially suited to frequency control systems for association with radio frequency oscillators and particularly such systems requiring a high degree of precision in tuning over a given range of variation.

Frequency discriminators of the type mentioned known heretofore are unsatisfactory in many applicaions because of lack of precision. It is essential to precise frequency control or measurement that the reference voltages be established at known phase and magnitude values. Preferably the reference voltages are equal in magnitude and opposite in phase. Where the center frequency of the input voltage is variable over a wide range, it is desirable that the phase and magnitude of the reference voltages remain fixed throughout the range of frequency variation. In prior systems, this has not been achieved because the phase inverter employed has been incapable of producing the desired frequency response, particularly, at radio frequencies.

Accordingly, it is an object of this invention to overcome such disadvantages of the prior art systems. More particularly, it is an object of this invention to provide a phase inverter for a frequency discriminator which will permit exceedingly precise frequency control or measurement.

A specific object of this invention is to provide a frequency discriminator which utilizes the phase inversion of an electron tube amplifier stage combined with a single variably tuned circuit.

A further object is to provide a frequency discriminator which requires but a single tuned circuit which may be varied over a wide range of frequency and hence may be easily tracked with associated equipment.

These and other objects and the manner in which they are accomplished will be apparent from the description which follows, taken in conjunction with the accompanying drawings, in which.

Figure 1:
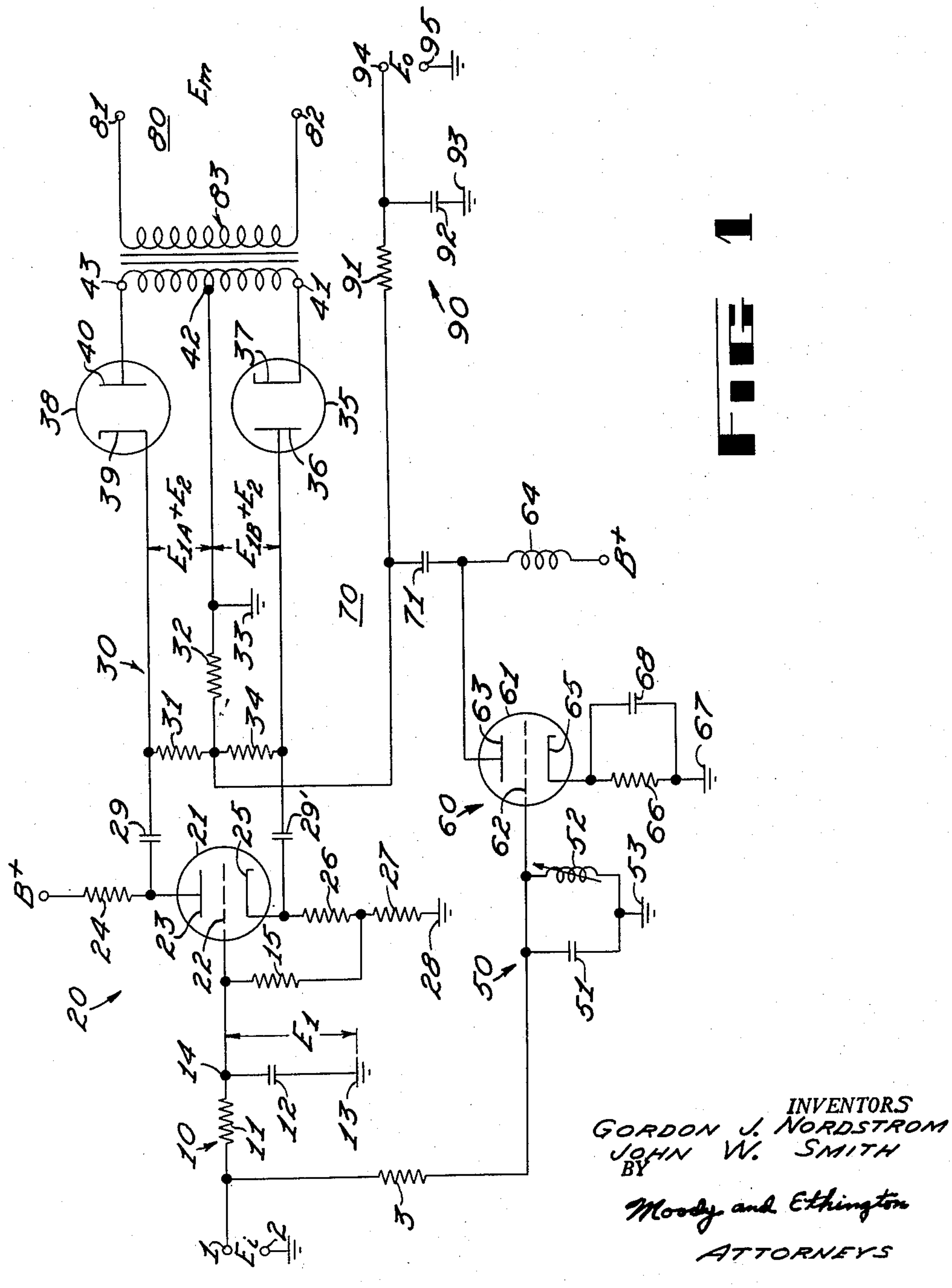
Figure 1 is a schematic circuit diagram illustrating the inventive discriminator.

The discriminator circuit as shown in the exemplary embodiment of Figure 1 comprises a pair of input terminals for connection to the associated voltage source which may be, for example, a variable frequency oscillator tunable over a predetermined frequency range. The input voltage $E_i$ is impressed across a reference voltage channel including a phase shift circuit 10 and a phase inverter circuit 20 comprising the electron tube 21 and its associated circuitry. The output of the phase inverter circuit provides two reference voltages each of which is impressed across a portion of the discriminating or detecting circuit 30.

The input voltage is also impressed across a frequency error voltage channel which includes the tuned circuit 50, amplifier stage 60 and a phase shift circuit 70. The output of the frequency error voltage channel is applied to the detecting network to produce an output voltage which is proportional in magnitude to the extent of departure of the input frequency from the center frequency and which has a polarity indicative of the direction of the frequency departure. Associated with the detecting circuit is a modulating circuit 80 for modulating the direct current output of the combining circuit with a relatively low frequency alternating voltage. This combination avoids the necessity for a vibratory interruptor to produce an output of the detecting or discriminating circuit which is alternating in character. This latter feature of the discriminator is disclosed and claimed in a co-pending application of Gordon Nordstrom filed March 26, 1954, S.N. 419,064, and assigned to the same assignee as the present invention.

Referring now in more detail to the circuit of Figure 1, an input voltage $E_1$, derived for example from a variable frequency oscillator, is impressed across the terminals 1 and 2. This input voltage is initially adjusted to a center or mean frequency value which is to be maintained at a constant value. The input voltage is applied to the reference voltage channel across the phase shift circuit 10. The phase shift circuit 10 includes a series resistor 11 and a shunt capacitor 12 connected to ground 13. The output from this phase shift circuit 10 is taken from the junction 14 between the resistor 11 and capacitor 12 and is applied to the phase inverter stage 20. Since the voltage from the phase shift device is taken across the capacitor terminal, this voltage will be lagging with respect to the input voltage.

This voltage is applied to the phase inverter stage 20 on the control grid 22 of electron tube 21. The plate electrode 23 of the tube is connected to the plate voltage supply source B+ through the plate circuit resistor 24. The cathode electrode 25 of the tube is connected to ground 28 through the cathode circuit resistor 26 and resistor 27. A grid leak resistor 15 is connected between the control grid 22 and the junction of resistor 26 and resistor 27.

A first phase reference voltage is developed by the output of the inverter stage 20 between the plate electrode 23 and ground 33. This phase reference voltage is of opposite phase with respect to the voltage applied to the control grid 22. A second phase reference voltage is developed between the cathode 25 and ground 28 and this voltage is of the same phase as the voltage applied to the grid 22.

The plate circuit resistor 24 is equal in value to the cathode circuit resistance comprising resistors 26 and 27. These resistors are of small value in order to minimize the effect of the inter-electrode capacitances of the tube 21 on the frequency response of the phase inverter. The tube 21 is preferably operated class A, or in other words, the tube is operated over the linear portion of the dynamic transfer curve with a bias such that conduction occurs throughout the complete cycle of voltage applied to the control electrode.

The phase inverter circuit 20 just described develops a pair of phase reference voltages which are equal in magnitude and opposite in phase. These phase reference voltages are applied to the detecting circuit 30 which will be described in detail subsequently.

A frequency error voltage channel is also supplied from the input voltage $E_1$ through the coupling resistor 3 to the frequency responsive circuit 50. The frequency responsive circuit is illustrated as a parallel resonant circuit comprising the parallel combination of capacitor 51 and the variable inductance 52 connected between resistor 3 and ground 53.

Figure 2:
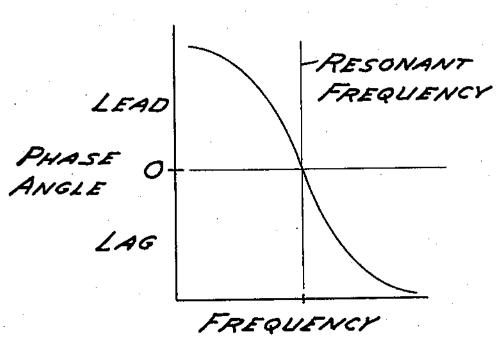
Figure 2 is a phase angle-frequency response curve of the tuned circuit 50 illustrated in Figure 1.

The phase angle-frequency response of such a parallel resonant circuit is illustrated in Figure 2 of the drawings. It is noted that at the resonant frequency of such a circuit the phase shift of the voltage across the parallel resonant circuit is zero. For frequencies lower than the resonant frequency, the phase shift produced is positive or leading with respect to the input voltage. For frequencies higher than the resonant frequency, the phase shift is negative or lagging with respect to the input voltage. The frequency to which this circuit is resonant may be adjusted to a desired value by the variable inductor 52 or any other well known tuning means. By the adjustment or tuning of this circuit the center frequency of the discriminator is established at the desired value.

The output from the frequency responsive circuit is applied to the amplifier stage 60 on the control grid 62 of electron tube 61. The plate electrode 63 of this tube is connected to a plate voltage supply source B+ through an inductance or choke coil 64. Such a load impedance in this amplifier stage is desirably inductive since this has the effect of reflecting a negative resistance into the grid circuit of the amplifier stage. Thus, loading of the parallel resonant circuit 50 is avoided. The cathode 65 of the tube 61 is connected to ground 67 through the cathode resistor 66 and a radio frequency bypass condenser 68 is connected in shunt with the resistor 66.

The output voltage of the amplifier stage 60 is 180 degrees out of phase with the voltage applied to grid 62 as is well known in amplifier operation. This output voltage is applied to a second phase shift circuit 70, which comprises the series capacitor 71 and the resistor 32, which is connected to ground 33. The voltage developed across the resistor 32 is leading with respect to the phase of the output voltage of the amplifier stage 60.

In the illustrative embodiment the output voltage of the phase shift circuit 10 is lagging with respect to the voltage impressed across its input terminals while the output of phase shift circuit 70 is leading with respect to the voltage across its input terminals. The phase shift angle produced by circuit 70 is caused to be the complement of the phase shift angle produced by circuit 10. This is readily accomplished by employing the resistance-capacitance phase shift circuits shown with the two circuits having corresponding components of equal value.

Figure 3:
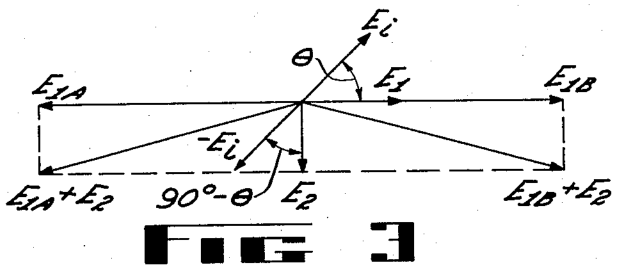
Figure 3 is a vector diagram of the component voltages in the system of Figure 1 showing the relationship when the input frequency is at the center frequency value.

Reference to Figure 3 shows the phase relation of the output voltage $E_1$ of phase shift circuit 10 and the output voltage $E_2$ of phase shift circuit 70 with respect to the input voltage $E_1$ when the input frequency is at the center frequency. Under this condition, the voltage $E_1$ lags the input voltage $E_1$ by a phase angle $\theta$. The amplifier stage 60 produces 180 degrees phase shift of $E_1$, shown as $-E_1$. This voltage $-E_1$ is applied to phase shift circuit 70 and the output voltage $E_2$ is advanced in phase by an angle of $90° - \theta$, the complement of $\theta$. The result is that the frequency error voltage $E_2$ is 90 degrees out of phase with the phase reference voltages $E_{1A}$ and $E_{1B}$ when the input frequency is at the center frequency value. Obviously this relation may be obtained by substitution of other suitable phase shift circuits. Furthermore, phase shift circuit 10 may produce a leading output and circuit 70 may produce a lagging output instead of the reverse arrangement described. It is now apparent that any departure of the frequency error voltage $E_2$ from the 90 degree phase relation to the phase reference voltages $E_{1A}$ and $E_{1B}$ is produced by the frequency responsive circuit 50 as a result of deviation of the source from the center frequency.

A discriminating or detecting circuit 30 is provided to produce an output direct current voltage which has an amplitude proportional to the frequency deviation from the center frequency value of the input voltage. The output voltage will have a polarity indicative of the direction of frequency deviation. This is accomplished by vectorially adding the first phase reference voltage and the frequency error voltage and rectifying the resultant. The second phase reference voltage is vectorially added to the frequency error voltage and the resultant is rectified. The two rectified voltages are compared in magnitude and a difference voltage is derived which is proportional to the frequency deviation of the input voltage. The detecting circuit is advantageously combined with a modulating circuit 80 which is the subject of the aforementioned co-pending patent application. The modulating circuit impresses an alternating component voltage upon the direct voltage output of the detecting circuit.

The combined circuitry of the detecting circuit 30 and the modulating circuit 80, in the exemplary embodiment, is as follows: The first phase reference voltage $E_{1A}$ is supplied to the detecting circuit by a connection from the plate 23 of the phase inverter tube 21 through a coupling capacitor 29, resistor 31 and common resistor 32 to ground 33. The second phase reference voltage $E_{1B}$ is supplied by a connection from the cathode 25 through a coupling capacitor 29', resistor 34 and resistor 32 to ground 33. The coupling capacitors 29 and 29' are of such value that the phase shift produced at the operating frequencies is negligible.

The frequency error voltage $E_2$ is developed in the detecting circuit across the common resistor 32 which is connected between the junction of resistors 31 and 34 and ground 33.

The modulating voltage $E_m$ is impressed across a pair of supply terminals 81 and 82 from a source (not shown) which is of relatively low frequency with respect to the center frequency of the voltage $E_1$, for example, 400 cycles per second. The modulating voltage is supplied to the detecting circuit through a transformer 83 which is provided with secondary winding center tap 42 connected to ground 33.

A diode 38 is connected across the voltages developed in one portion of the detecting circuit with the anode 40 connected to the transformer secondary terminal 43 and cathode 39 connected to the junction of capacitor 29 and resistor 31. A diode 35 has the cathode 37 connected to the transformer secondary terminal 41 and the anode connected to the junction of capacitor 29' and resistor 34.

The impressed voltages cause circulating currents to flow in the two loop circuits of the detecting circuit 30 just described. The loop currents are oppositely directed through the common resistor 32 and a differential voltage appears across resistor 32 to ground which is proportional to the difference of current magnitudes. This differential voltage is applied across output filter 90 which includes series resistor 91 and shunt capacitor 92 having one terminal connected to ground 93. The output voltage $E_0$ taken from the filter section appears across terminals 94 and 95.

In operation of the discriminator system, it is assumed for purposes of explanation that the discriminator is to be used as a frequency control device for a variable frequency oscillator having a range of 200 to 300 kilocycles per second. It is desired to tune the oscillator to a predetermined frequency, for example, 250 kilocycles per second and to maintain the frequency of the source substantially constant.

The output of the input voltage source is connected across the input terminals, 1 and 2, and is designated $E_1$. In Figure 3, the input voltage is represented by the vector $E_1$ and is taken as a reference voltage for establishing the phase relation of the other voltages in the system. The input voltage is applied in the reference voltage channel across the phase shift circuit 10. This phase shift circuit is designed in a manner well understood by those skilled in the art to produce a phase shift of the output voltage which is lagging by 45 degrees with respect to the input voltage at the center frequency of 250 kilocycles per second. The output voltage from the phase shift circuit is designated as $E_1$ and is applied to the control grid of the phase inverter circuit.

The output voltage from the phase inverter tube 21 which appears across resistors 31 and 32 between the plate and ground is represented by the voltage vector $E_{1A}$ and is 180 degrees displaced with respect to the grid voltage $E_1$. The output voltage of tube 21 appearing between the cathode and a ground across resistors 34 and 32 is represented by the voltage vector $E_{1B}$ which is in phase with the grid voltage $E_1$. The reference phase voltages $E_{1A}$ and $E_{1B}$ are equal in magnitude and opposite in phase.

The input voltage from the terminals 1 and 2 is applied also to the frequency error channel across the parallel resonant circuit 50. At the input center frequency of 250 kilocycles per second, the parallel resonant circuit produces zero phase shift as shown by reference to Figure 2. The voltage appearing across the parallel resonant circuit is applied to grid 62 of amplifier stage 60. The voltage appearing in the output circuit of the amplifier stage 60 is 180 degrees out of phase with the voltage applied to the grid 62. The amplifier output voltage is applied across the phase shift circuit 70, which is designed to produce a phase shift of the input voltage of a positive 45 degrees with respect to the applied voltage. This output voltage from the phase shift circuit 70 is represented by the voltage vector $E_2$ and is displaced 225 degrees ahead of the input voltage $E_1$ for the center frequency of 250 kilocycles per second.

Disregarding for the time being the effect of the modulating voltage $E_m$, it will be apparent that the vector sum of the voltage $E_{1A}$ and the voltage $E_2$ is applied across diode 38. This vector resultant voltage produces a rectified current through common resistor 32 which is proportional to the voltage magnitude. In a similar manner, the resultant of voltages $E_{1B}$ and $E_2$ causes a rectified current flow through diode 35 and common resistor 32 in the opposite direction.

Reference to Figure 3 shows that the vector sums are of equal magnitude. Therefore, the magnitude of the circulating currents will be equal, but oppositely directed. The net voltage appearing across the common resistor 32 is zero and therefore the control voltage output is zero.

The effect of the modulating voltage from modulating circuit 80 for this condition of operation when the input frequency is at its center frequency value is as follows: On alternate half cycles of the modulating voltage, the anode 40 of diode 38 will be rendered positive with respect to cathode 39 and conduction will result. Also, anode 36 will be rendered positive with respect to cathode 37 in diode 35 and conduction in this branch will also result. Since both loops have the common path through resistor 32 and the direction of current flow in the common path due to conduction in diode 38 is opposite to the current flow due to the conduction of diode 35, the net voltage appearing across resistor 32 will be zero. Therefore, for operation at the center frequency value, the control voltage output remains zero.

Figure 4:
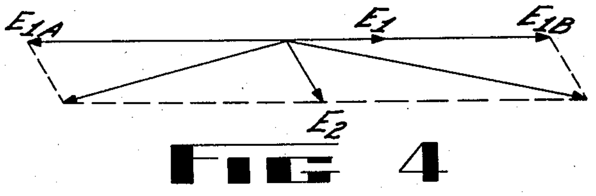
Figure 4 is a vector diagram showing the voltage relation wnen the input voltage is below the center frequency value.

Referring now to Figure 4, assume that the frequency of the input source has departed from the center frequency value of 250 kilocycles to some lower value of frequency. The reference phase voltages $E_{1A}$ and $E_{1B}$ developed by the phase inverter 20 as represented on the vector diagram still remain equal in magnitude and opposite in phase. The voltage appearing across the parallel resonant circuit 50 in the frequency error channel is leading with respect to the input voltage by a phase angle dependent upon the extent of frequency departure from the center frequency value. This voltage vector is represented by $E_2$ in Figure 4. It is apparent that the vector sum of the reference phase voltage $E_{1B}$ and frequency error voltage $E_2$ is of greater magnitude than the vector sum of the reference phase voltage $E_{1A}$ and the frequency error voltage $E_2$. The result is that the total voltage applied across the diode 35 is larger than that across diode 38. Therefore, a net direct voltage appears across the resistor 32 of a magnitude which is proportional to the extent of frequency departure of the source from the center frequency value. This voltage is applied across the filter network 90 and appears as an output control voltage between the terminals 94 and 95.

Figure 5:
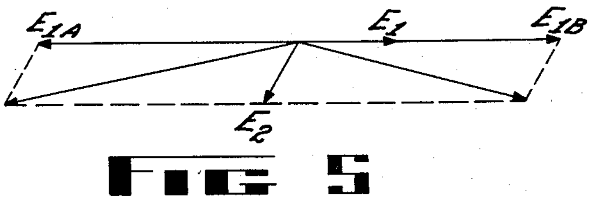
Figure 5 is a vector diagram showing the voltage relation which obtains in the circuit when the input voltage is above the center frequency.

Refer now to Figure 5 and assume that the frequency of the oscillator has departed from the center frequency value to some higher value of frequency. The reference phase voltages $E_{1A}$ and $E_{1B}$ produced by phase inverter 20 remain equal in magnitude and opposite in phase. The input voltage applied across the parallel resonant circuit 50 now appears across the output terminals of the resonant circuit with a phase which is lagging with respect to the input voltage. The phase angle by which the output voltage lags is proportional to the extent to which the input frequency has varied from the center frequency value. This voltage output from the resonant circuit is amplified in amplifier stage 60 and develops the frequency error voltage represented by the voltage vector $E_2$ in Figure 5 across resistor 32. The vector sum of the reference phase voltage $E_{1A}$ and the frequency error voltage $E_2$ now has larger magnitude than the vector sum of the reference phase voltage $E_{1B}$ and the frequency error voltage $E_2$. As the result, the direct current through diode 38 exceeds the value of direct current flowing through diode 35. The net direct voltage modulated at the frequency of the modulating voltage source appears across the resistor 32. The magnitude of this direct voltage is proportional to the extent of the frequency departure of the input source from the center frequency value. The polarity is opposite to the net voltage which appeared when the frequency source varied to a value lower than the center frequency value and is indicative of the direction of departure. This voltage appearing across resistor 32 is impressed across the filter section 90 and the output terminals 94 and 95.

In either of the latter cases the vector sum of the reference phase voltage $E_{1A}$ and the frequency error voltage $E_2$ is different in magnitude from the vector sum of the reference phase voltage $E_{1B}$ and the frequency error voltage $E_2$. These voltages are impressed across the respective non-linear conductive devices shown as diodes 35 and 38 and may be considered to established the operating points on the non-linear voltage-current characteristic. The modulating voltage of relatively lower magnitude from the source $E_m$ is impressed across each diode through the respective secondary portions 41—42 and 42—43 of transformer 80. This modulating voltage causes equal voltage variations about the operating point of both diodes; however, since the operating points for the diodes are different, this results in unequal current variations in the tubes by reason of the non-linearity.

The result is a net differential alternating current flowing in the common path through resistor 32. The magnitude of this current and the voltage developed thereby is proportional to the extent of frequency departure from the center frequency value and of a phase indicative of the direction of departure.

The output terminals 94 and 95 may be connected to the input terminals of a servomechanism or to any suitable control device for adjusting the oscillator frequency to its center frequency value.

The discriminator circuit has been described in detail with respect to its application as a frequency control device. It is particularly well adapted for precise frequency control since it requires a single tuned circuit and the phase inverter has a frequency response such that the reference phase voltages are of equal magnitude and opposite phase throughout a large range of frequency variation. It will now occur to those skilled in the art that the discriminator may be advantageously applied otherwise such as a detector in a frequency modulated or phase modulated radio apparatus. Indeed, there are numerous applications in which it is desired to determine with precision the frequency deviation of an oscillating voltage from a predetermined value.

The frequency discriminator has been described and illustrated with respect to a specific embodiment. However, numerous modifications will now become apparent to others and the exemplary embodiment is not to be construed as a limitation. For a definition of the invention, reference is made to the appended claim.

We claim:

A frequency discriminator comprising an input voltage source which is subject to variation about a mean frequency, a reference voltage channel and a frequency error voltage channel energized by said source, said reference voltage channel including a first phase shift circuit for phase shifting its received voltage by 45° in one direction at said mean frequency, said first phase shift circuit connected between said source and a phase inverter for driving first and second reference voltages of equal magnitude and opposite phase, comprising an electron tube having grid, cathode, and anode electrodes, said grid electrode connected to said input voltage source, said cathode electrode connected to ground through a cathode circuit resistance, a plate voltage source having one terminal connected to ground, said anode electrode connected to the other terminal of said plate voltage source through a plate circuit resistance equal to the cathode circuit resistance, a first impedance connected between said plate electrode and ground for developing said first reference voltage, a second equal impedance connected between said cathode electrode and ground for developing said second reference voltage, said frequency error voltage channel including a tunable frequency responsive circuit and a second phase shift circuit for phase shifting its received voltage by 45° in an opposite direction at said mean frequency, said second phase shift circuit connected across said input source for producing an error voltage having a phase relation to said reference voltages which depends upon the departure of the source voltage from said mean frequency, means for vectorially adding said error voltage to said first reference voltages for obtaining a first resultant voltage, means for vectorially adding said error voltage to said second reference voltage for obtaining a second resultant voltage, means for combining said resultant voltages in a differential manner for obtaining a control voltage proportional to the departure of said input voltage source from said mean frequency, a switching-signal source, and means for switching off and on both of said vectorial adding means to modulate said discriminator output.

References Cited in the file of this patent

UNITED STATES PATENTS

| | | |
|---|---|---|
| 2,415,468 | Webb | Feb. 11, 1947 |
| 2,562,943 | Pensyl | Aug. 7, 1951 |
| 2,585,532 | Briggs | Feb. 12, 1952 |
| 2,652,489 | Robinson | Sept. 15, 1953 |
| 2,675,475 | Trousdale | Apr. 13, 1954 |
| 2,755,378 | Stover | July 17, 1956 |